United States Patent
Coyle et al.

(10) Patent No.: US 12,398,935 B2
(45) Date of Patent: Aug. 26, 2025

(54) FLANGE-MOUNTED INLINE VALVE WITH INTEGRATED ELECTRICAL FEED

(71) Applicant: Parker-Hannifin Corporation, Cleveland, OH (US)

(72) Inventors: Eric R. Coyle, Washington, MO (US); Christian D. Parker, New Haven, MO (US); Craig M. Obermark, Union, MO (US)

(73) Assignee: Parker-Hannifin Corporation, Cleveland, OH (US)

( * ) Notice: Subject to any disclaimer, the term of this patent is extended or adjusted under 35 U.S.C. 154(b) by 388 days.

(21) Appl. No.: 17/906,661

(22) PCT Filed: Mar. 29, 2021

(86) PCT No.: PCT/US2021/024554
§ 371 (c)(1),
(2) Date: Sep. 19, 2022

(87) PCT Pub. No.: WO2021/206938
PCT Pub. Date: Oct. 14, 2021

(65) Prior Publication Data
US 2023/0122190 A1    Apr. 20, 2023

Related U.S. Application Data

(60) Provisional application No. 63/006,993, filed on Apr. 8, 2020.

(51) Int. Cl.
*F25B 41/34* (2021.01)

(52) U.S. Cl.
CPC .......... *F25B 41/34* (2021.01); *F25B 2500/17* (2013.01); *F25B 2500/221* (2013.01)

(58) Field of Classification Search
CPC . F25B 41/34; F25B 2500/17; F25B 2500/221
See application file for complete search history.

(56) References Cited

U.S. PATENT DOCUMENTS

| 10,119,735 B2 | 11/2018 | Zhang et al. |
| 2014/0245778 A1 | 9/2014 | Suzuki et al. |
| 2017/0175910 A1* | 6/2017 | Tomasko .............. F16K 15/063 |

FOREIGN PATENT DOCUMENTS

| CN | 203533738 U | 4/2014 |
| CN | 205534296 U | 8/2016 |

(Continued)

OTHER PUBLICATIONS

Lee, Micro expansion valve using micro-electro-mechanical device and manufacturing method micro-electro-mechanical device, 2004, Full Document (Year: 2004).*

(Continued)

*Primary Examiner* — Nael N Babaa
(74) *Attorney, Agent, or Firm* — Renner, Otto, Boisselle & Sklar, LLP

(57) ABSTRACT

A flange-mounted inline valve arrangement includes a flange having an internal fluid passage, and an inline electrically-operable valve coupled to the flange. The inline valve includes a valve body and a valve member movable relative to the fluid passage in the flange for controlling flow. The valve arrangement also includes an electrical feed that connects to the electrically-operable valve through the flange for enabling an electrical connection external to the flange and other system piping. At least part of the electrical feed may be in a flow path and is fluidly sealed to prevent electrical shorts. The valve arrangement may be installed into the system as a single unit with an exterior coupling of the electrical feed on an exterior part of the flange to easily make the external electrical connection. The valve arrange- (Continued)

ment may be used in a chiller, where the inline valve is an electronic expansion valve.

20 Claims, 5 Drawing Sheets

(56) References Cited

FOREIGN PATENT DOCUMENTS

| | | | |
|---|---|---|---|
| CN | 209012499 U | 6/2019 | |
| CN | 107044741 B | 8/2019 | |
| CN | 110985393 A | 4/2020 | |
| DE | 112012003944 T5 | 7/2014 | |
| EP | 0408536 A1 | 1/1991 | |
| KR | 20040106154 A * | 12/2004 | .............. F25B 41/06 |

OTHER PUBLICATIONS

International Search Report and Written Opinion of the International Searching Authority for corresponding International Patent Application No. PCT/US2021/024554, mailed Jul. 1, 2021.
"Series 60 Electric Actuators—Technical Sales Manual," Bray International, Inc., Sep. 2, 2022, retrieved online at https://www.bray.com/docs/default-source/manuals-guides/technical-sales-guide/en_br_tsm_s70-electric-actuator_20220822.pdf?sfvrsn=550da9a2_7.

\* cited by examiner

FLANGE-MOUNTED INLINE VALVE WITH INTEGRATED ELECTRICAL FEED

RELATED APPLICATIONS

This application is a national phase of International Application No. PCT/US2021/024554 filed Mar. 29, 2021, which claims the benefit of U.S. Provisional Application No. 63/006,993 filed Apr. 8, 2020, each of which is hereby incorporated herein by reference in its entirety.

TECHNICAL FIELD

The present disclosure generally relates to a flow control device, and more particularly to a flange-mounted inline valve arrangement, such as for cooling systems, for example, chillers.

BACKGROUND

Chiller systems may be used to cool large spaces or equipment, such as manufacturing machines. Chillers generally include a compressor, a condenser evaporator, a flash tank economizer, and a thermostatic expansion device, typically in the form of fixed orifice plates. Such fixed orifice plates can be integrated inline in the system through flanged connectors. In some circumstances, however, it is desirable to use an electronic expansion valve instead of a fixed mechanical flow control solution in a chiller system.

SUMMARY

Electronic expansion valves can have some drawbacks. For example, some solutions include butterfly valves with a motor that is located outside of the system, which can be undesirably large and limit system flexibility. Additionally, this type of valve introduces multiple leak paths into the system such as leaks through a shaft seal to the motor.

A unique valve arrangement is disclosed herein that provides a flange-mounted electrically-operable inline valve, along with an electrical feed that connects to the valve through the flange for enabling an electrical connection external to the flange and other system piping.

The inline valve is operatively coupled to the flange such that the valve components are internal to the system piping when installed. Such a design eliminates the large motor head of conventional designs that is located outside of the system, along with associated external shaft seal and mounting constraints. The inline valve also offers more precise flow control over butterfly valve alternatives.

Moreover, the inline valve may be preassembled to the flange which may facilitate installation. The flange mount may be similar to the flange mount of the existing fixed orifice expansion device, which enables retrofitting and reduces installation costs. The internal wiring of the valve can be prewired and sealed in the electrical feed before installation, thereby leaving the flanged connection as the only leak path for the cooling fluid, which is the same as the existing flange mounted fixed orifice device.

According to an aspect, a flange-mounted inline valve arrangement, includes: a flange having an internal flow passage configured for fluid flow therethrough; an electrically-operable inline valve having a valve body and a valve member movable relative to the valve body, the valve body being operatively coupled to the flange such that movement of the valve member enables control of fluid flow through the internal flow passage of the flange; and an electrical feed having a first portion operatively coupled to the inline electrically-operable valve and a second portion extending through the flange for enabling an electrical connection external of the flange.

According to another aspect, an electronic expansion valve arrangement includes: a valve having a valve body and an axially moveable piston; a flange on which the valve is mounted, the flange having a passage from an exterior portion of the flange to an interior portion of the flange, the flange defining a central orifice aligned with the axially moveable piston; an electrical feed coupling the valve body to the interior portion of the flange; and an electrical connector coupled to the exterior portion of the flange though which an electrical connection can be made to a power source.

According to another aspect, a method of fabricating a flange-mounted inline valve arrangement, includes: operatively coupling an electrically-operable inline valve to a flange having an internal flow passage such that a valve member of the valve is movable to control fluid flow through the flow passage when in use; operatively coupling at least a portion of an electrical feed to the valve, such that the electrical feed extends from the valve through the flange for enabling an external electrical connection; and electrically wiring the valve by passing an electrical wire from the valve through the electrical feed so that an end of the electrical is accessible for making an electrical connection external of the flange.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention.

FIG. 3 rear perspective view of the flange-mounted valve arrangement in

FIG. 2.

DETAILED DESCRIPTION

The principles and aspects of the present disclosure have particular application to expansion valves utilized in cooling systems, such as for use in a vapor compression refrigerant cycle system typically found in, but not limited to, chillers for cooling equipment, large facilities, or the like, and thus will be described below chiefly in this context. It is also understood that principles and aspects according to the present disclosure may be applicable to other fluid modulating valves for use in other portions of a cooling/refrigerant system, or in other fluid systems generally, such as a heat pump or refrigeration systems, where it is desirable to provide one or more of the advantageous features provided by the exemplary fluid modulating valve described herein.

As used herein, the term "fluid" means a substance having no fixed shape, including liquids, vapors, and/or gases. As used herein, "cooling fluid" means a working fluid used as the heat carrier for a cooling system. The cooling fluid may be a refrigerant. The refrigerant may include any material suitable for such use. These materials include, ammonia and various CFCs or HCFCs, and include replacements for the environmentally undesirable CFCs and HCFCs, including, e.g., R12, R22 and R410a, and R-32, for example.

Figure 1:
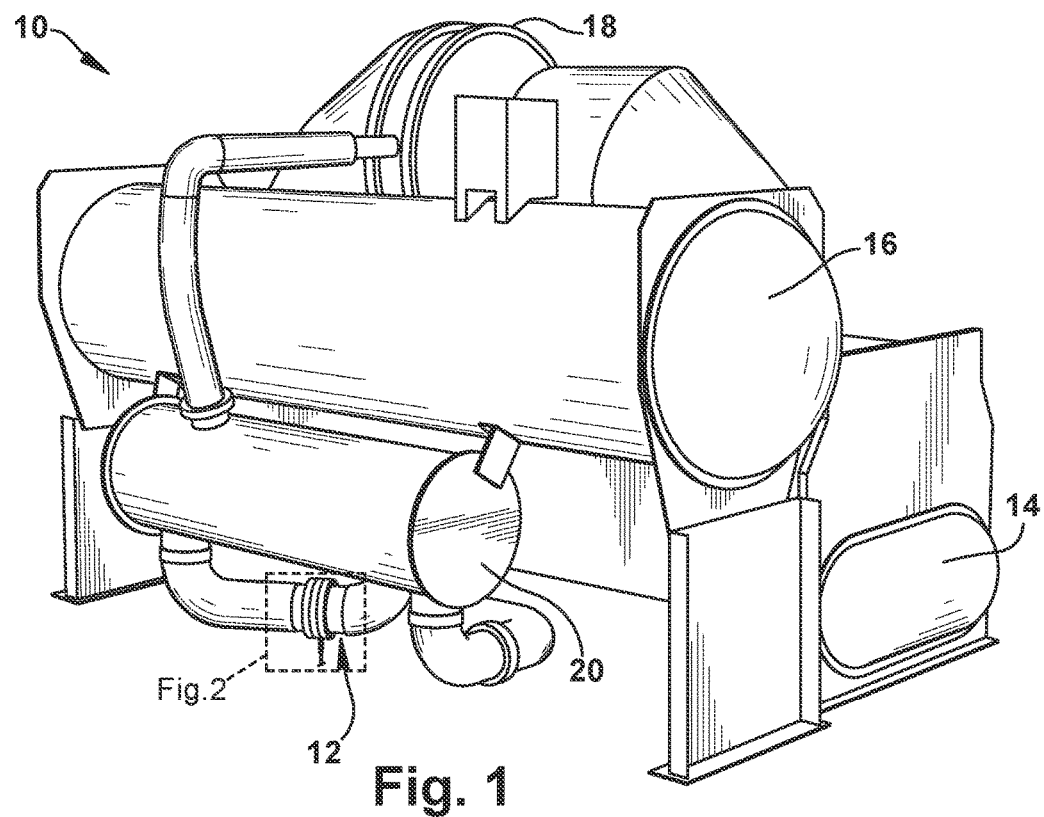
FIG. 1 is a perspective view of a cooling system including an exemplary flange-mounted valve arrangement according to an embodiment of the present disclosure.

Referring to FIG. 1, an exemplary cooling system 10 having an exemplary flange-mounted inline valve arrangement 12 is shown. The cooling system 10 is a chiller in the illustrated embodiment, and includes an evaporator 14 exposed to a space that is to be cooled, a condenser 16 that is located outside of the cooled space, a compressor 18 positioned between the evaporator outlet and the condenser inlet, and the flange-mounted inline valve arrangement 12. A cooling fluid circulating through the system 10 is compressed by the compressor 18 which raises the temperature and pressure of the cooling fluid. The then hot pressurized cooling fluid gas flows through the condenser 16 which serves as heat exchanger to allow the cooling fluid to dissipate heat. The condenser 16 lowers the cooling fluid temperature such that the cooling fluid condenses into a liquid. The cooling fluid then flows through the flange-mounted inline valve arrangement 12, which is configured to control flow of the compressed and liquified cooling fluid from the condenser 16 to the evaporator 14. In the illustrated embodiment, the cooling system 10 also includes a flash tank economizer 20 which is utilized in a well-known manner.

Figure 2:
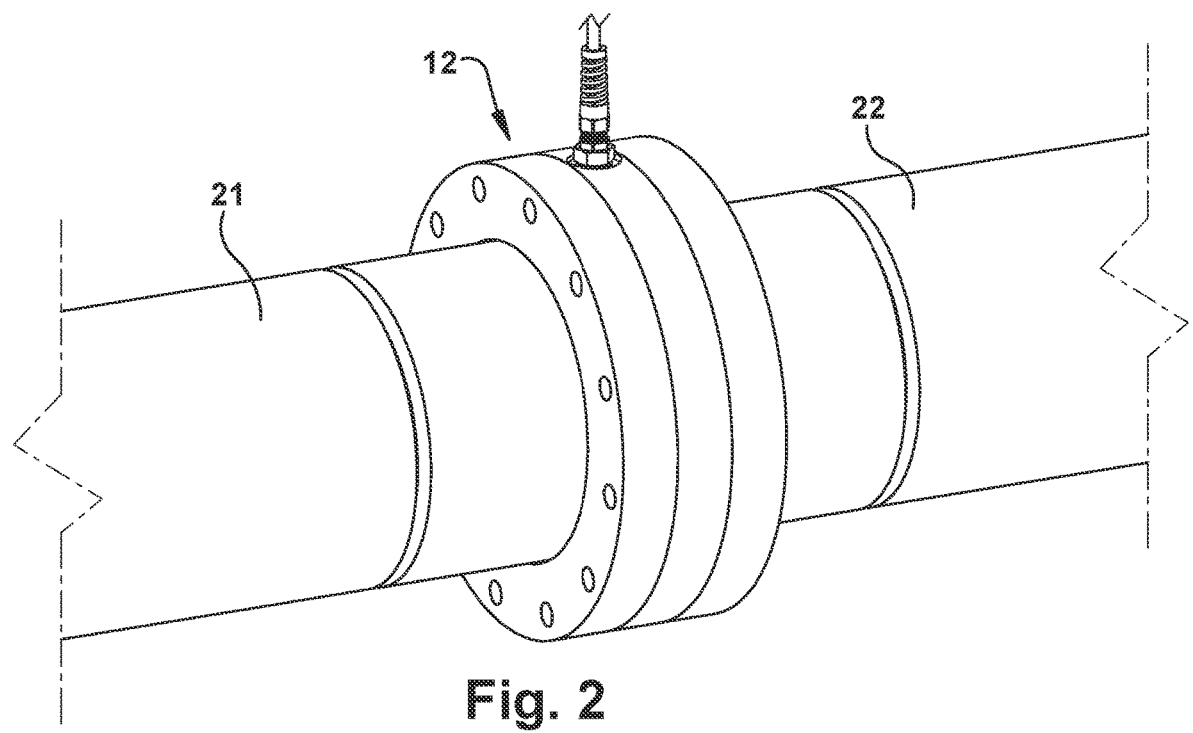
FIG. 2 is an enlarged view of a section of the cooling system in FIG. 1 showing the flange-mounted valve arrangement in further detail.
Figure 3:
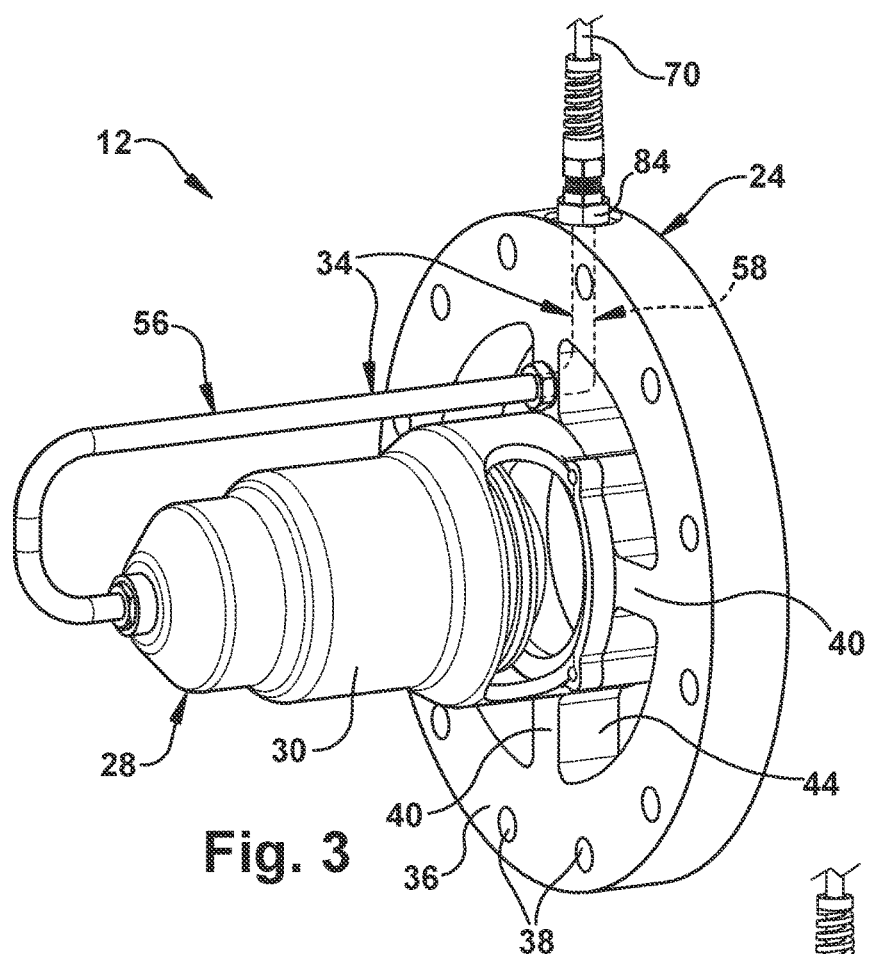
Figure 4:
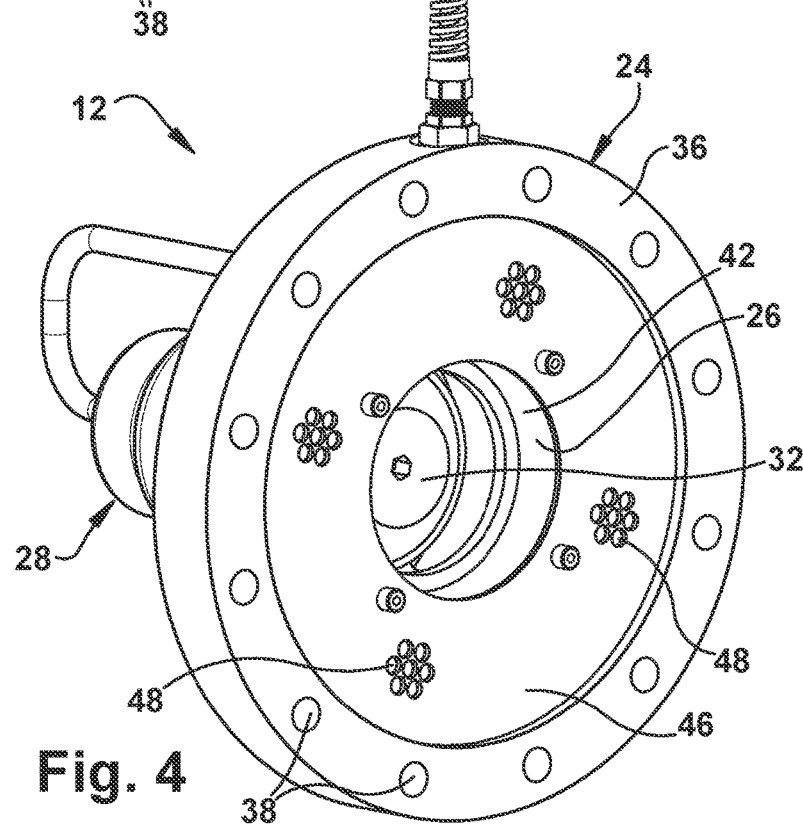
FIG. 4 is a front perspective view of the flange-mounted valve arrangement.

Referring to FIG. 2, an enlarged view of a section of the cooling system 10 containing the flange-mounted inline valve arrangement 12 is shown. As shown, the flange-mounted inline valve 12 may be used to connect two sections of pipe 21, 22 together. In the illustrated embodiment, the flange-mounted inline valve arrangement 12 is configured to include an electronic expansion valve (described below), in which the liquid cooling fluid moves from a high pressure zone into a low pressure zone, thus expanding and evaporating the cooling fluid, and thereby becoming cold. The cold cooling fluid passes downstream of the valve arrangement 12 into circuits of the evaporator 14, thus absorbing heat from inside the space that is to be cooled. The cooling system 10 can be used, for example, in the plenum of a forced air residential or commercial air conditioning system through which air is blown for cooling the interior of the residence or building. Other applications include commercial food storage units, or factory equipment, for example.

As shown, the valve arrangement 12 generally includes a flange 24 having an internal flow passage 26 through which fluid flows, and an electrically-operable inline valve 28 (also referred to as inline valve 28) operatively coupled to the flange 24. The inline valve 28 includes a valve body 30 operatively coupled to, or supported by, the flange 24, and a valve member 32 that is movable relative to the valve body 30 and the flange 24 to control fluid flow through the internal passage 26 of the flange. The exemplary valve arrangement 12 also includes an electrical feed 34 that connects to the inline valve 28 through the flange 24 for enabling an electrical connection external to the flange and other system piping.

The flange 24 may be any suitable structure that provides additional strength, stiffness, or supporting area, and/or provides a connection for pipes, valves, pumps, and/or other equipment within the fluid circuit. In the illustrated embodiment, the flange 24 includes a flange mounting portion 36 (also referred to as a rim) including a plurality of fastener receivers 38, such as through-holes, that are utilized to join the two sections of pipe 21, 22 together via suitable fasteners, such as bolts. The configuration of the flange 24 and locations of the fastener receivers 38 may be adapted to match that of an existing conventional flange design to enable ease of installation and retrofittability of the exemplary valve arrangement 12.

As shown, the internal flow passage 26 of the flange through which fluid flows is a centrally-located main flow passage in the illustrated embodiment. In exemplary embodiments, the flange 24 includes a plurality of circumferentially spaced apart and radially extending projections 40 (e.g., spokes) that connect a radially inner central portion 42 of the flange (i.e., hub portion 42 containing the flow passage 26) to the radially outer mounting portion 36 (i.e., rim portion). In the illustrated embodiment, the open regions 44 between the radial projections 40 (spokes) also form flow paths, which may be covered by a plate 46 having one or more regions of fixed orifice hole(s) 48 corresponding with the open regions 44 in the flange. The fixed orifice holes 48 enable a minimum amount of flow when the inline valve 28 is operated to a minimum flow condition, as discussed in further detail below.

It is understood that the open regions 44 and/or orifice holes 48 might not be present in all suitable applications. For example, the plate 46 may be a solid piece (without orifice holes) attached to the flange 24, but still would have the main flow passage 26 extending therethrough. Alternatively, the flange 24 could be constructed with a unitary and solid radially inner portion extending between the hub portion 42 and mounting portion 36 (i.e., a unitary part of the flange 24 corresponding with plate 46). It also is understood that when orifice hole(s) 48 are present, the size, number and location of hole(s) 48 may vary from model-to-model or application-to-application.

The inline valve 28 may be any suitable type of valve that regulates, directs or controls the flow of fluid as desired by the particular application. As discussed above, the configuration of the inline valve 28 and location in the cooling system 10 in the illustrated embodiment enables the valve 28 to serve as an electronic expansion valve. As shown, the valve body 30 is configured to be contained within the system piping and is thus configured for exposure to fluid (e.g., refrigerant) in the system 10. In the illustrated embodiment, the valve body 30 is operatively coupled to the flange 24 (e.g., central hub portion) via a mount 50 having a through-opening 52 associated with the internal flow passage 26 of the flange 24 for enabling fluid flow therethrough. The valve body 30 may be operatively coupled to the flange 24 by welding, screwing, integrally forming, or in any other suitable manner.

As shown, the valve body 30 forms a housing that houses the valve member 32 and an electrically-operable actuator 54 that is configured to move the valve member 32. In exemplary embodiments, the actuator 54 is an electric motor that receives power and/or a control signal via the electrical feed 34. In the illustrated embodiment, the valve member 32 is configured to include a piston that is movable in the axial direction relative to the flow passage 26 (e.g., main orifice) defined by the flange 24. The valve member 32 (e.g., piston) therefore can be controlled to regulate the flow of cooling fluid through the flow passage 26 based on system needs and performance. For example, when the valve member 32 is in a first (minimum flow) position (e.g., left-most position in FIG. 5) the valve member 32 will restrict or trim the fluid flow to provide a minimum flow through the passages 26, 52. In a second (maximum flow) position, the valve member 32 will permit a maximum flow capacity through the passages 26, 52, such as 30x more flow than the minimum (first) position.

The electrical feed 34 may be any suitable device, structure or combination of structures that enables a supply of electricity (e.g., current, voltage, signals, etc.) to or from the inline valve 28. In exemplary embodiments, the electrical feed 34 includes at least a first portion 56 operatively coupled to the inline valve 28, and a second portion 58 extending through the flange 24 for enabling an electrical connection external of the flange 24. The first portion 56, second portion 58, and/or any intermediate portions of the electrical feed 34 may include one or more suitable passages for carrying one or more electrical lines (e.g., wire), for example. The electrical feed 34 may provide a hermetic seal to prevent contact of the fluid (e.g., refrigerant) with any electrical lines of the feed 34.

In the illustrated embodiment, the first portion 56 of the electrical feed 34 (first electrical feed portion 56) includes a conduit 60 having an internal passage 62 that contains one or more electrical wires (not shown). As shown, a first end of the conduit 60 is operatively coupled to an opening, or port 64, in the valve body 30, and a second end of the conduit 60 is operatively coupled to an opening, or port 66, in a part of the flange 24 that forms the second portion 58 of the electrical feed. In exemplary embodiments, the first and second ends of the conduit 60 are operatively coupled to the valve body 30 and flange 24, respectively, with suitable electrical feedthrough connectors 68, 69. The feedthrough connectors 68, 69 provide an easy way to connect the conduit 56. Because the flow of fluid through the valve 28 may be relatively high, the internal passage 62 of the first portion (conduit) 56 may contain some of the working fluid (e.g., refrigerant), which may have leaked through a pathway in the valve member 32 (e.g., piston assembly). The conduit 56 and connectors 68, 69 provide protection to the electrical wire(s)/cables (not shown) by preventing them from being unsupported in the refrigerant flow. Because at least some of the first electrical feed portion 56 is disposed within the system piping and exposed to fluid, the feedthrough connectors 68, 69 also may include suitable seals to restrict ingress of fluid into the conduit 60.

In the illustrated embodiment, the second portion 58 of the electrical feed (second electrical feed portion 58) is formed by a part of the flange 24 that provides an operative connection to the first electrical feed portion 56, and which also enables an electrical connection external of the flange 34 and system piping. Any suitable connection or connections may be provided between the first and second electrical feed portions 56, 58, and between the second electrical feed portion 58 and external electrical connection. The external electrical connection may include an electrical coupling to an external electrical line 70 (e.g., wire(s)), which may be electrically connected to a power supply and/or electronic controller, for example.

As shown in the illustrated embodiment, the second electrical feed portion 58 includes a first (interior) part 72 that opens through an interior portion of the flange 24 via the interior port 66 which enables the operative connection to the first electrical feed portion 56 (e.g., conduit 60). Also as shown, the second electrical feed portion 58 includes a second (exterior) part 74 that opens through an exterior portion of the flange via an exterior opening, or port 76, that enables the external electrical connection (e.g., to electrical line/wires 70). Generally, the interior portion of the flange 24 includes a radially inner region (generally shown at 72) that is configured for exposure to fluid, which may include a region radially inward of the fastener receivers 38. Generally, the exterior portion of the flange includes a radially outer region (generally shown at 74) that is configured for exposure to ambient environment external of the flange 24, which may include a region at and/or radially outward of the fastener receivers 38.

The interior (first) part 72 and exterior (second) part 74 of the second electrical feed portion 58 may be at any suitable locations and have any suitable configurations for providing the electrical feed connection(s). In exemplary embodiments, the second electrical feed portion 58 extends radially between a radially outer and radially inner portion of the flange 24. In the illustrated embodiment, for example, at least one of the radially extending projections 40 (e.g., spokes) of the flange includes an internal passage 78 that forms at least part of the second electrical feed portion 58. As shown, the internal passage 78 extends from the interior port 66 through the radial projection 40 and through the flange mounting portion 36 to the exterior port 76 and is configured to carry electrical wire(s) or other suitable electrical communication between and through the ports 66, 76. The interior port 66 opens through an axially facing surface 80 of the flange projection 40 that faces toward the actuator end of the valve 28, and the exterior port 76 opens through the radially outer cylindrical peripheral surface 82 of the flange.

As discussed above, in some embodiments the flange 24 might not have radial projections 40 (e.g., spokes) with open regions 44 therebetween, but instead could have a solid radially inner portion (unitary or attached) extending radially between the central hub portion 42 and mounting portion 36. Generally, the second electrical feed portion 58 includes a radially extending passage for supporting the electrical wire(s) or cables, which may be internal to, or supported by, such a radially extending inner portion of the flange 24.

As noted above, the operative connection between the first electrical feed portion 56 (e.g., conduit 60) and second electrical feed portion 58 (e.g., at radial projection 40 with passage 78) may be made by electrical feedthrough connector 69 which may be disposed in the interior port 66. In addition, an external feedthrough connector 84 may be disposed in the exterior port 76 for enabling the connection to the external electrical line 70. The external feedthrough connector 84 may provide a hermetic seal to prevent egress of fluid out of the system.

The exemplary flange-mounted valve arrangement 12 including the flange 24, inline valve 28, and electrical feed 34 may be a preassembled unit that enables ease of installation into the cooling system 10. The internal electrical wiring for the valve 28 (not shown) also can be preassembled to extend through the electrical feed 34 with suitable sealing before installation. This leaves the flanged connection to the pipe or pipes as the only leak path for cooling fluid, which is the same as an existing flange mounted fixed orifice device. The prewired electrical line(s) of the valve arrangement 12 may extend out of the exterior port 76 for connection to the external electrical line(s) 70, or may be bundled within the internal passage 78 of the second electrical feed part 58 during shipping for later connection. The exterior feedthrough connector 84 may be removed and reinstalled during the external electrical connection, or may be provided by the installer along with the external electrical line(s) 70.

Figure 6:
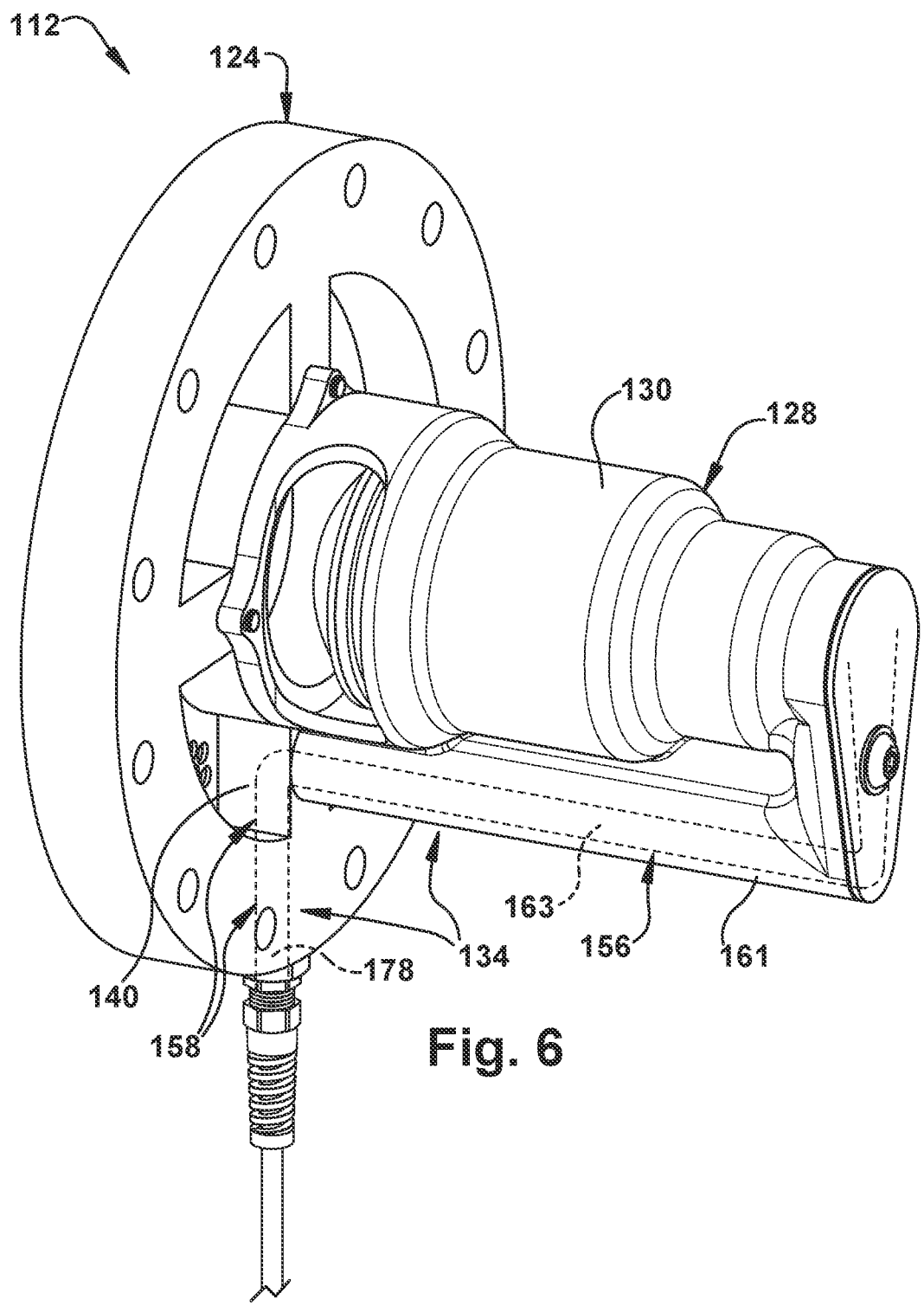
FIG. 6 is a perspective view of another exemplary flange-mounted valve arrangement according to an embodiment of the present disclosure.

Turning to FIG. 6, another exemplary embodiment of a flange-mounted valve arrangement 112 is shown. The valve arrangement 112 is substantially similar to the above-referenced valve arrangement 12, and consequently the same reference numerals but indexed by 100 are used to denote structures corresponding to similar structures. In addition, the foregoing description of the valve arrangement 12 is equally applicable to the valve arrangement 112 except as understood by the description below. It is also understood that aspects of the valve arrangements 12, 112 may be substituted for one another or used in conjunction with one another where applicable.

As shown in FIG. 6, the valve arrangement 112 is essentially the same as valve arrangement 12, including a flange 124, an electrically-operable inline valve 128, and an electrical feed 134, except the first electrical feed portion 156 is modified in the illustrated embodiment. Specifically, instead of a discrete and connected conduit 60, the first electrical feed portion 156 includes a housing 161 having an internal passage 163, in which the housing 161 is unitary with the valve body 130 and is mounted to the flange 124 along with the valve body 130 as a single unit. The housing 161 forming the first electrical feed portion 156 may have any suitable configuration and may be formed to be unitary with the valve housing 130 using any suitable technique. For example, the unitary structure of the valve body 130 and electrical feed housing 161 may be cast and then machined into the desired structure. Although the machining complexity may be greater than that of the valve arrangement 12 described above, the configuration of the valve arrangement 112 removes some components and simplifies routing and securing the electrical connection.

Similarly to the valve arrangement 12, the valve arrangement 112 may include a radially extending portion 140 (e.g., spoke) of the flange 124 that includes an internal passage 178 forming at least a part of the second electrical feed portion 158. The internal passage 178 of the second portion is connected to the internal passage 163 of the housing 161 (first electrical feed portion) to enable electrical wires to run therethrough and connect to the electrically-operable actuator 154 of the valve 128. The interior and exterior ports (hidden from view) of the second electrical feed portion 158 in the flange may be essentially the same as that described above. A suitable connector, such as a feed-through connector (hidden from view), may be utilized to sealingly couple the passages 163, 178 of the respective electrical feed portions 156, 158 together.

Also similarly to the valve arrangement 12, the internal electrical wiring of the valve 128 of flange-mounted valve arrangement 112 also can be preassembled to extend through the electrical feed 134 with suitable sealing before installation of the valve arrangement 112. To facilitate electrical connection to the electrically-operable actuator 154 (e.g., electric motor) of the valve, the housing 161 of the first electrical feed portion 156 may include a removable and sealable cover 185 though which an electrical connection to the valve 128 can be made.

Figure 7:
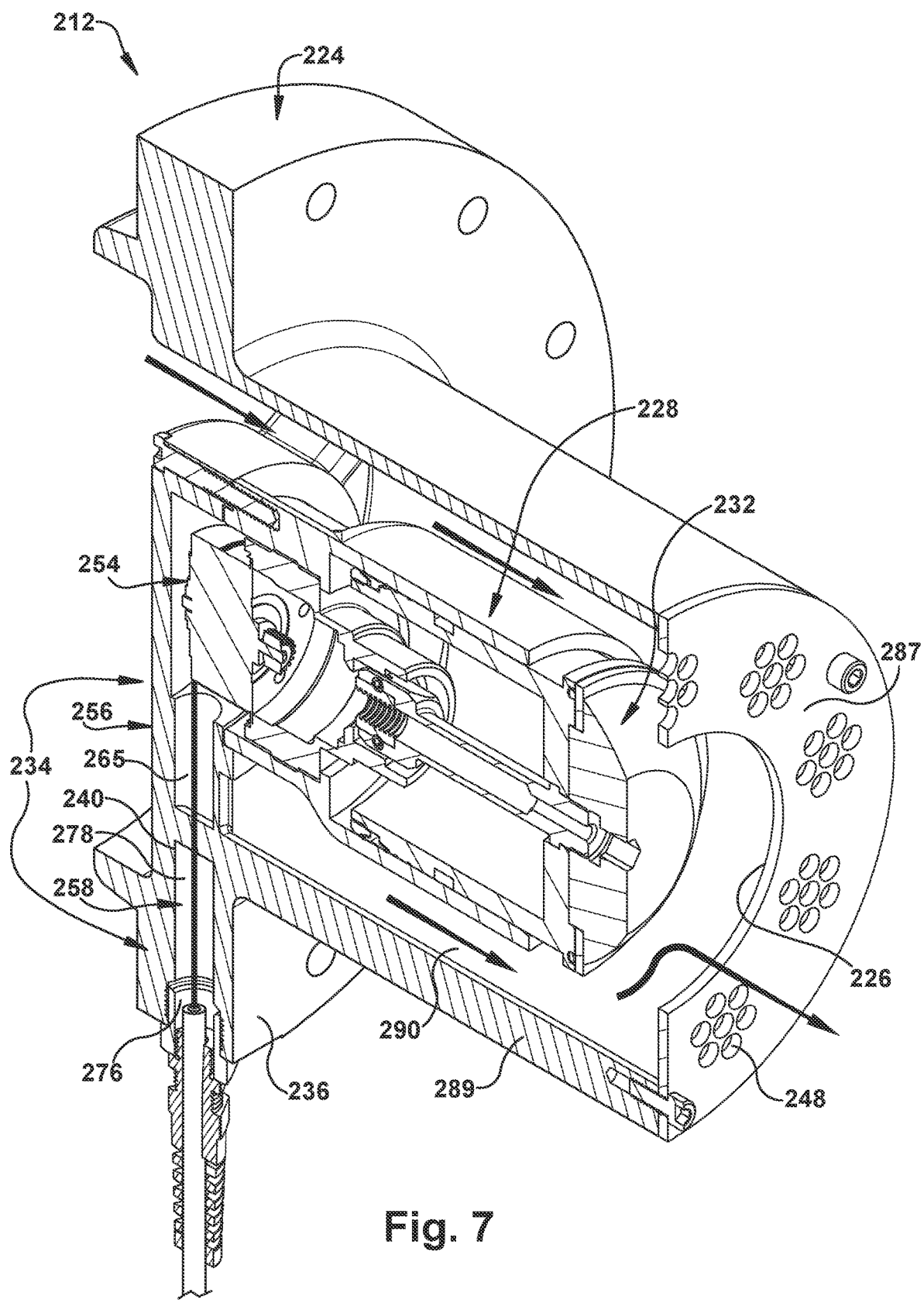
FIG. 7 is a perspective view of another exemplary flange-mounted valve arrangement according to an embodiment of the present disclosure.

Turning to FIG. 7, another exemplary embodiment of a flange-mounted valve arrangement 212 is shown. The valve arrangement 212 is similar to the above-referenced valve arrangement 12, and consequently the same reference numerals but indexed by 200 are used to denote structures corresponding to similar structures. In addition, the foregoing description of the valve arrangements 12, 112 are equally applicable to the valve arrangement 212 except as understood by the description below. It is also understood that aspects of the valve arrangements 12, 112, 212 may be substituted for one another or used in conjunction with one another where applicable.

Figure 5:
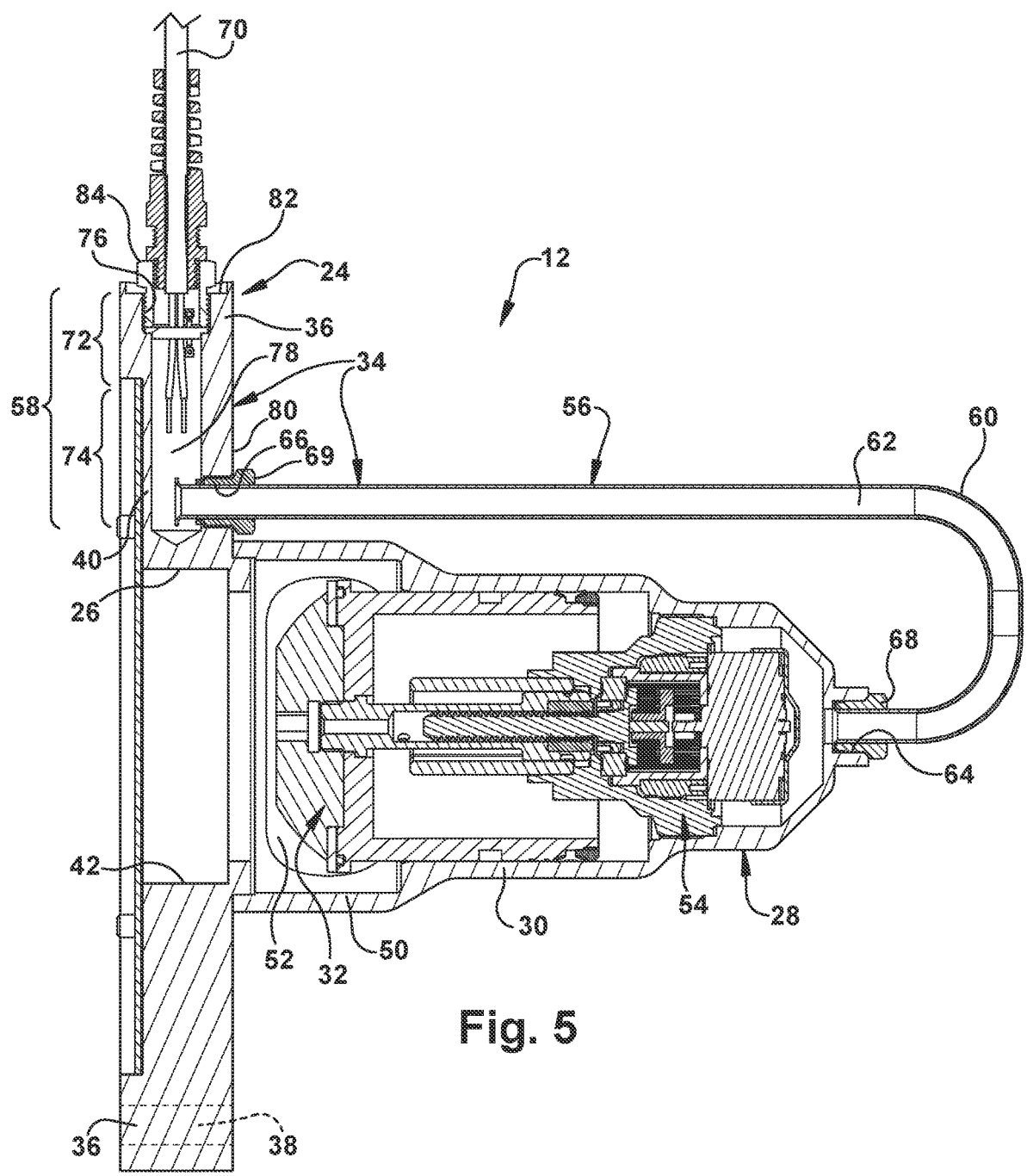
FIG. 5 is a cross-sectional side view of the flange-mounted valve arrangement.

As shown in FIG. 7, the valve arrangement 212 minimizes the run length of the electrical feed 234 by arranging the electrically-operable actuator 254 of the valve 228 axially proximal the mounting portion 236 (e.g., rim) of the flange 224. In this manner, the end of the valve member 232 opposite the actuator 254 is arranged axially distal the mounting portion 236 of the flange. The second electrical feed portion 258 in the flange is similar to that described above in connection with valve arrangement 12, and includes a radially extending internal passage 278 through the mounting portion 236 and through a radially extending inner portion 240 (e.g., projection) of the flange. Instead of an axially extending first electrical feed portion 56 or 156 as shown in FIGS. 5 and 6, however, the valve arrangement 212 forms the internal passage 265 of the first electrical feed portion 256 as an extension to the internal passage 278 of the second electrical feed portion 258. In the illustrated embodiment, because the actuator 254 is axially aligned with the exterior port 276, the combined first and second passages 265, 278 provide a straight and short path to electrically connect to the valve 228.

Also as shown in the illustrated embodiment, because the actuator end of the valve 228 would block the central flow passage of the flange, the valve arrangement 212 arranges the main central flow passage 226 at an axially offset location from the mounting portion 236 of the flange. In exemplary embodiments, the internal flow passage 226 is formed by a plate 287 operatively coupled to an axially extending support 289. The plate 287 also may contain fixed orifice openings 248 similarly to the above-described designs. The support 289 is operatively coupled to the flange 224 by any suitable means, such as via welding, fastening, integrally forming, or the like. As shown, the axially extending support 289 may form an internal flow chamber 290 within which the inline valve 228 is disposed. In some embodiments, flow enters an upstream side of the internal flow chamber 290 (e.g., proximal the actuator end of the valve 228) and flows out of the internal chamber 290 via the main flow passage 226 and/or fixed orifices 248. In other embodiments, fluid flow or the arrangement of the valve 228 may be reversed. The operation of the valve member 232 to control flow between a maximum and a minimum still is essentially the same. A tradeoff of this design is that although it shortens the electrical feed run length (and thus length of electrical wiring), fluid flow characteristics may be interrupted by virtue of the axially extending internal chamber 290 and valve 228 disposed therein.

Exemplary flange-mounted inline valve arrangements have been described herein, which include a flange having an internal fluid passage, and an electrically-operable inline valve coupled to the flange. The inline valve includes a valve body and a valve member movable relative to the fluid passage in the flange for controlling flow. The valve arrangement also includes an electrical feed that connects to the electrically-operable valve through the flange for enabling an electrical connection external to the flange and other system piping. At least part of the electrical feed may be in a flow path and is fluidly sealed to prevent electrical shorts. The valve arrangement may be installed into the system as a single unit with an exterior coupling of the electrical feed on an exterior part of the flange to easily make the external electrical connection. The valve arrangement may be used in a refrigeration system, where the inline valve is an electronic expansion valve. A fixed orifice device also may be used in conjunction with the valve.

According to an aspect a flange-mounted inline valve arrangement, includes: a flange having an internal flow passage configured for fluid flow therethrough; an electrically-operable inline valve having a valve body and a valve member movable relative to the valve body, the valve body being operatively coupled to the flange such that movement of the valve member enables control of fluid flow through the internal flow passage of the flange; and an electrical feed having a first portion operatively coupled to the inline electrically-operable valve and a second portion extending through the flange for enabling an electrical connection external of the flange.

Embodiments may include one or more of the following additional features, separately or in any combination.

In some embodiments, the second portion of the electrical feed includes a first part that opens through an interior portion of the flange and a second part that opens through an exterior portion of the flange.

In some embodiments, the flange includes fastener receivers for mounting the flange, wherein a region of the interior portion of the flange through which the first part opens is radially inward of the fastener receivers, and wherein a region of the exterior portion of the flange through which the second part opens includes or is radially outward of the fastener receivers.

In some embodiments, the region of the interior portion of the flange through which the first part opens includes a radially inner surface of the flange configured for exposure to fluid.

In some embodiments, the region of the exterior portion of the flange through which the second part opens includes a radially outer surface of the flange configured for exposure to ambient environment external of the flange.

In some embodiments, the radially outer surface of the flange is a radially outer cylindrical peripheral surface of the flange.

In some embodiments, the flange includes a radially inwardly extending portion, and wherein the second portion of the electrical feed includes a radially inwardly extending internal passage within the radially inwardly extending portion, the internal passage having a first opening configured for coupling to an internal passage of the first portion of the electrical feed, and the radially inwardly extending internal passage having an opposite second opening configured for enabling the electrical connection external of the flange.

In some embodiments, a first electrical feedthrough connector is disposed in the first opening and is coupled to a second part of the first portion of the electrical feed; and wherein a second electrical feedthrough connector is disposed in the second opening and is configured for coupling to an external electrical line.

In some embodiments, the first portion of the electrical feed includes a conduit having an internal passage, a first end portion operatively coupled to the valve body, and a second end portion operatively coupled to the second portion of the electrical feed.

In some embodiments, the first end portion of the first portion of the electrical feed is operatively coupled to the valve body with an electrical feedthrough connector.

In some embodiments, the first portion of the electrical feed is configured for exposure to fluid.

In some embodiments, the first portion of the electrical feed includes a housing having an internal passage, in which the housing is unitary with the valve body and is mounted to the flange along with the valve as a unit.

In some embodiments, the flange includes a radially extending portion, and wherein the second portion of the electrical feed includes a radially extending internal passage within the radially extending portion, the internal passage of the second portion being connected to the internal passage of the housing of the first portion.

In some embodiments, the housing of the electrical feed includes a cover through which an electrical connection to the valve can be made.

In some embodiments, an electrically-operable actuator of the valve is axially proximal a mounting portion of the flange, and an end of the valve member opposite the actuator is axially distal the mounting portion of the flange; wherein the second portion of the electrical feed includes a second radially extending internal passage through the mounting portion of the flange; and wherein the first portion of the electrical feed includes a first radially extending internal passage that is an extension of the second passage.

In some embodiments, at least a portion of the electrically-operable actuator of the valve is axially aligned with an exterior port of the second portion of the electrical feed, and wherein the extension of the second passage with the first passage provides a straight passage.

In some embodiments, the internal flow passage of the flange is axially offset from the mounting portion of the flange.

In some embodiments, the internal flow passage is formed by a plate operatively mounted to the mounting portion of the flange via an axially extending support that forms an internal flow chamber, and wherein the valve body is disposed within the internal flow chamber of the support.

According to another aspect, an electronic expansion valve arrangement includes: a valve having a valve body and an axially moveable piston; a flange on which the valve is mounted, the flange having a passage from an exterior portion of the flange to an interior portion of the flange, the flange defining a central orifice aligned with the axially moveable piston; an electrical feed coupling the valve body to the interior portion of the flange; and an electrical connector coupled to the exterior portion of the flange though which an electrical connection can be made to a power source.

According to another aspect, a cooling system includes: an evaporator, a condenser, a compressor, and the valve arrangement according to any of the foregoing.

According to another aspect, a method of fabricating a flange-mounted inline valve arrangement, includes: operatively coupling an electrically-operable inline valve to a flange having an internal flow passage such that a valve member of the valve is movable to control fluid flow through the flow passage when in use; operatively coupling at least a portion of an electrical feed to the valve, such that the electrical feed extends from the valve through the flange for enabling an external electrical connection; and electrically wiring the valve by passing an electrical wire from the valve through the electrical feed so that an end of the electrical is accessible for making an electrical connection external of the flange.

It is to be understood that terms such as "top," "bottom," "upper," "lower," "left," "right," "front," "rear," "forward," "rearward," and the like as used herein may refer to an arbitrary frame of reference, rather than to the ordinary gravitational frame of reference.

The phrase "and/or" should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A flange-mounted inline valve arrangement, comprising:
   a flange having an internal flow passage configured for fluid flow therethrough;
   an electrically-operable inline valve having a valve body and a valve member movable relative to the valve body, the valve body being operatively coupled to the flange such that movement of the valve member enables control of fluid flow through the internal flow passage of the flange; and
   an electrical feed having a first portion operatively coupled to the inline electrically-operable valve and a second portion extending through the flange for enabling an electrical connection external of the flange, wherein the flange includes a radially extending portion, and wherein the second portion of the electrical feed includes a radially extending internal passage within the radially extending portion.

2. The valve arrangement according to claim 1, wherein the second portion of the electrical feed includes a first part that opens through an interior portion of the flange and a second part that opens through an exterior portion of the flange.

3. The valve arrangement according to claim 2, wherein the flange includes fastener receivers for mounting the flange, wherein a region of the interior portion of the flange through which the first part opens is radially inward of the fastener receivers, and wherein a region of the exterior portion of the flange through which the second part opens includes or is radially outward of the fastener receivers.

4. The valve arrangement according to claim 2, wherein the region of the interior portion of the flange through which the first part opens includes a radially inner surface of the flange configured for exposure to fluid.

5. The valve arrangement according to claim 2, wherein the region of the exterior portion of the flange through which the second part opens includes a radially outer surface of the flange configured for exposure to ambient environment external of the flange.

6. The valve arrangement according to claim 5, wherein the radially outer surface of the flange is a radially outer cylindrical peripheral surface of the flange.

7. The valve arrangement according to claim 1, wherein the flange includes a radially inwardly extending portion, and wherein the second portion of the electrical feed includes a radially inwardly extending internal passage within the radially inwardly extending portion, the internal passage having a first opening configured for coupling to an internal passage of the first portion of the electrical feed, and the radially inwardly extending internal passage having an opposite second opening configured for enabling the electrical connection external of the flange.

8. The valve arrangement according to claim 7, wherein a first electrical feedthrough connector is disposed in the first opening and is coupled to a second part of the first portion of the electrical feed; and wherein a second electrical feedthrough connector is disposed in the second opening and is configured for coupling to an external electrical line.

9. The valve arrangement according to claim 1, wherein the first portion of the electrical feed includes a conduit having an internal passage, a first end portion operatively coupled to the valve body, and a second end portion operatively coupled to the second portion of the electrical feed.

10. The valve arrangement according to claim 9, wherein the first end portion of the first portion of the electrical feed is operatively coupled to the valve body with an electrical feedthrough connector.

11. The valve arrangement according to claim 1, wherein the first portion of the electrical feed is configured for exposure to fluid.

12. The valve arrangement according to claim 1, wherein the first portion of the electrical feed includes a housing having an internal passage, in which the housing is unitary with the valve body and is mounted to the flange along with the valve as a unit.

13. The valve arrangement according to claim 12, wherein the internal passage of the second portion is connected to the internal passage of the housing of the first portion.

14. The valve arrangement according to claim 12, wherein the housing of the electrical feed includes a cover through which an electrical connection to the valve can be made.

15. The valve arrangement according to claim 1,
   wherein an electrically-operable actuator of the valve is axially proximal a mounting portion of the flange, and an end of the valve member opposite the actuator is axially distal the mounting portion of the flange;
   wherein the second portion of the electrical feed includes a second radially extending internal passage through the mounting portion of the flange; and
   wherein the first portion of the electrical feed includes a first radially extending internal passage that is an extension of the second passage.

16. The valve arrangement according to claim 15, wherein at least a portion of the electrically-operable actuator of the valve is axially aligned with an exterior port of the second portion of the electrical feed, and wherein the extension of the second passage with the first passage provides a straight passage.

17. The valve arrangement according to claim 15, wherein the internal flow passage of the flange is axially offset from the mounting portion of the flange.

18. The valve arrangement according to claim 15, wherein the internal flow passage is formed by a plate operatively mounted to the mounting portion of the flange via an axially extending support that forms an internal flow chamber, and wherein the valve body is disposed within the internal flow chamber of the support.

19. A cooling system, comprising:
   an evaporator, a condenser, a compressor, and the valve arrangement according to claim 1.

20. A flange-mounted inline valve arrangement, comprising:
   a flange having an internal flow passage configured for fluid flow therethrough;
   an electrically-operable inline valve having a valve body and a valve member movable relative to the valve body, the valve body being operatively coupled to the flange such that movement of the valve member enables control of fluid flow through the internal flow passage of the flange; and
   an electrical feed having a first portion operatively coupled to the inline electrically-operable valve and a second portion extending through the flange for enabling an electrical connection external of the flange,
   wherein the first portion of the electrical feed includes a housing having an internal passage, in which the housing is unitary with the valve body and is mounted to the flange along with the valve as a unit.

* * * * *